(12) United States Patent
Jain et al.

(10) Patent No.: US 12,401,616 B2
(45) Date of Patent: Aug. 26, 2025

(54) MULTIPLE DATA CENTER COMPATIBLE DEPLOYMENT OF APPLICATIONS MATCHING A WILDCARD DOMAIN NAME

(71) Applicant: Palo Alto Networks, Inc., Santa Clara, CA (US)

(72) Inventors: Jayant Jain, Cupertino, CA (US); Brian Russell Kean, Cincinnati, OH (US); Mingfei Peng, Pleasanton, CA (US); Harieasswar Lakshmidevi, San Francisco, CA (US); Harish Kumar Lohar, Naperville, IL (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 18/533,522

(22) Filed: Dec. 8, 2023

(65) Prior Publication Data

US 2025/0193148 A1   Jun. 12, 2025

(51) Int. Cl.
*H04L 61/4511* (2022.01)
*H04L 61/5007* (2022.01)

(52) U.S. Cl.
CPC ...... *H04L 61/4511* (2022.05); *H04L 61/5007* (2022.05)

(58) Field of Classification Search
CPC .......................... H04L 61/4511; H04L 61/5007
USPC ......................................................... 709/245
See application file for complete search history.

(56) References Cited

U.S. PATENT DOCUMENTS

| | | | |
|---|---|---|---|
| 7,194,552 B1* | 3/2007 | Schneider | H04L 61/3015 709/217 |
| 8,224,994 B1* | 7/2012 | Schneider | G06Q 30/02 709/217 |
| 10,862,852 B1* | 12/2020 | Thunga | H04L 67/565 |
| 10,979,387 B2 | 4/2021 | Maslak | |
| 11,457,040 B1* | 9/2022 | Sole | H04L 63/101 |

(Continued)

FOREIGN PATENT DOCUMENTS

CN        115884152 A        3/2023

OTHER PUBLICATIONS

PCT Application No. PCT/US2024/058780, ISR & WO mailed Mar. 14, 2025, 10 pages.

(Continued)

*Primary Examiner* — Ruolei Zong
(74) *Attorney, Agent, or Firm* — Gilliam IP PLLC (57) ABSTRACT

A network controller communicates a wildcard domain name defined by a tenant and IP addresses of data centers for which a tenant has configured that wildcard to network elements of a network fabric through which the data centers are accessible. Each network element creates a rule to forward DNS requests with FQDNs that match the wildcard to each data center IP address. When a network element receives a DNS request indicating a FQDN that matches the wildcard, the network element forwards the DNS request to each data center IP address. Each data center element associated with one of the IP addresses receives the DNS request and determines if the FQDN can be resolved to an IP address in that data center. Data center elements for which domain name resolution is successful notify the network controller, which onboards the resource corresponding to the FQDN in that data center.

20 Claims, 6 Drawing Sheets

(56) References Cited

U.S. PATENT DOCUMENTS

| | | | | |
|---|---|---|---|---|
| 2014/0215059 | A1* | 7/2014 | Astiz Lezaun | H04L 67/1008 |
| | | | | 709/224 |
| 2014/0281032 | A1* | 9/2014 | Roskind | H04L 61/4511 |
| | | | | 709/245 |
| 2016/0261564 | A1* | 9/2016 | Foxhoven | H04L 63/20 |
| 2021/0119961 | A1 | 4/2021 | Thunga et al. | |
| 2021/0314291 | A1* | 10/2021 | Chandrashekhar | H04L 45/42 |
| 2023/0344921 | A1* | 10/2023 | Duraisamy | H04L 63/0272 |

OTHER PUBLICATIONS

ZTE, "KI#1 EAS Discovery Procedure with EASDF", 3GPP Draft, S2-2102902, 3rd Generation Partnership Project (3GPP), Mobile Competence Centre, France, vol. SA WG2, No. e-meeting, 5 pages, Apr. 6, 2021.

* cited by examiner

MULTIPLE DATA CENTER COMPATIBLE DEPLOYMENT OF APPLICATIONS MATCHING A WILDCARD DOMAIN NAME

BACKGROUND

The disclosure generally relates to transmission of digital information (e.g., CPC class H04L) and network arrangements, protocols or services for addressing or naming (e.g., subclass H04L 61/00).

Internet-accessible resources, such as websites, are commonly assigned domain names as a human-readable alternative to their IP addresses. The Domain Name System (DNS) manages translation of domain names to their corresponding IP addresses as part of requesting resources accessed via their domain names. The process of converting a domain name to its corresponding IP address is sometimes referred to as DNS resolution or simply domain name resolution. Because the DNS is a hierarchical system, domain names can indicate a variety of domain levels, with fully qualified domain names (FQDNs) including all domain levels of the associated resource.

The anycast methodology allows for a single Internet Protocol (IP) address to be shared by multiple devices (e.g., multiple servers). An "anycast address" is an IP address that is shared by multiple devices in accordance with anycast addressing. Requests that designate an anycast address as a destination address can be served by any of the devices associated with the anycast address. With anycast routing, a determination of which of a set of devices that receives a request indicating the anycast address is based on cost or distance such that the request is delivered to the individual device that is nearest to the sender and/or associated with the lowest cost.

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Terminology

This description uses the term "application connector" to refer to a network element deployed in a network to front an application. The application connector "fronts" an application by providing access to an instance of the application without publicizing a network address assigned to the application instance. Fronting an application is also referred to herein as proxying or being a proxy for an application.

The description refers to a "network controller." This term refers to a device programmed and configured to provide instructions/commands for network management and/or orchestrating network functions, or to a program(s) that generates instructions/commands for network management and/or orchestrating network functions when the program(s) is executed.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

Cloud-hosted applications and websites (collectively "resources" for brevity) of a tenant may have domain names that are encompassed by a domain name with a wildcard character, referred to herein as a "wildcard domain name." For instance, the domain names "a.example" and "b.example" are both encompassed by and match to the wildcard domain name "*.example", where the asterisk denotes the wildcard portion of the domain name. Disclosed herein are techniques by which different resources of a tenant that match to the same wildcard domain name can be hosted in different data centers, with discovery and onboarding of individual resources across the data centers being automated rather than manually configured by the tenant. To illustrate, a tenant can configure a wildcard domain name of "*.example" for multiple data centers, and individual applications with FQDNs "a.example" and "b.example" will be discovered and onboarded in their respective ones of the data centers with the disclosed technique.

Securely offering these resources with the flexibility of wildcard matching, scalability, and wide geographic availability involves complex configurations of DNS forwarding through a network fabric and DNS resolution within multiple data centers. Additionally, there currently is no user-friendly solution for tenants to identify their resources that are encompassed by a wildcard domain name and are deployed across data centers (e.g., those in different regions). When a tenant configures a DNS forwarding rule that indicates a wildcard domain name and one or more data centers as a target(s), a network controller obtains the configuration and determines one or more IP addresses associated with the target data center(s) (e.g., an anycast IP address allocated for each data center). IP addresses associated with a target data center may be those of application connectors or other proxies that are deployed in the respective data center and receive network traffic that is destined for the resources hosted therein, and anycast IP addresses may be utilized such that each data center is associated with one anycast IP address that is allocated across application connectors or proxies deployed to the corresponding data center. The network controller communicates a forwarding rule comprising the wildcard domain name and the IP address(es) of the target data center(s) to the network elements, where the network elements share an anycast IP address to facilitate load balancing of eventual DNS requests and form a full mesh so that each data center is accessible from each network element. Each of the network elements installs the forwarding rule communicated from the network controller so that matching DNS requests are forwarded to the one or more IP addresses of each target data center.

When a network element receives a DNS request for a FQDN that matches to the wildcard domain name, the network element forwards the DNS request to each of the corresponding IP addresses. If each data center element (i.e., the application connector or proxy) deployed to a data center is allocated an anycast IP address that is shared across data center elements at that data center, DNS requests can also be load balanced across the data center elements with equal cost. Upon the DNS request reaching the data center element having one of the IP addresses, the data center element attempts to resolve the FQDN to an IP address that is routable within the data center. If DNS resolution is successful, the data center element notifies the network controller of the DNS resolution. The FQDN can resolve to an IP address in one or multiple data centers depending on where individual resources have been deployed. Upon discovery of the FQDN in at least a first data center, the network controller allocates a virtual IP address for the FQDN, configures a DNS entry to resolve the FQDN to the virtual IP address, and orchestrates configuration of forwarding rules that forward network traffic indicating the domain name to the data center(s) in which the domain name was resolved successfully and for which the network controller obtains a notification. Subsequent network traffic destined for the newly onboarded resource can thus be forwarded directly to the data center(s) in which it was discovered, with the network traffic load balanced across network elements having allocated an anycast IP address as the network topology and load balancing strategy allows. Also, where anycast IP addresses are also uniquely allocated for each data center and shared by data center elements located therein for resource discovery, network traffic can also be load balanced across the data center elements in each data center.

Example Illustrations

Figure 1:
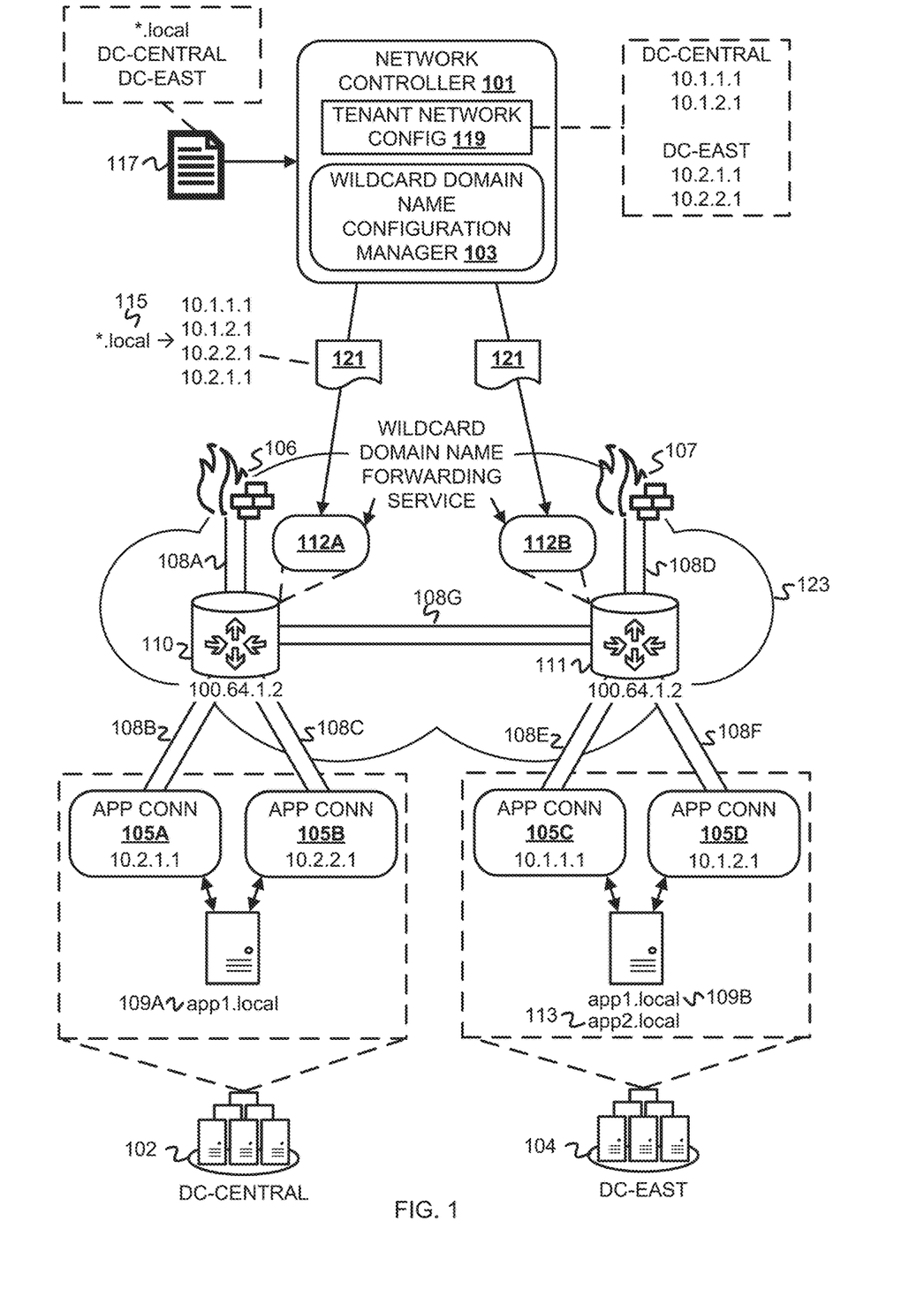
FIG. 1 is a conceptual diagram of cross-data center configuration of reachability for resources of a tenant with domain names that match to a wildcard domain name.

FIG. 1 is a conceptual diagram of cross-data center configuration of reachability for resources of a tenant with domain names that match to a wildcard domain name. FIG. 1 depicts a network controller 101 and a network fabric 123. The network controller 101 and network elements of the network fabric 123 have various capabilities to onboard application connectors and resources for tenants and to create routes through the network fabric 123 to extend the network fabric 123 into tenant networks, which in this example includes a data center 102 and a data center 104. In this example, the network fabric 123 includes a secure gateway 106, a secure gateway 107, a router 110, and a router 111, each of which is programmed with load balancing functionality. The secure gateways 106, 107 manage access of users to tenant resources through enforcement of security policies. The secure gateways 106, 107 can comprise firewalls or secure web gateways, for example. Users of the tenant can connect to one of the secure gateways 106, 107 to access tenant resources. Network elements of the network fabric 123, including the routers 110, 111, have been assigned an anycast IP address 100.64.1.2. Though not depicted in this example for simplicity, secure gateways of the network fabric 123 that are connected to multiple routers can load balance network traffic across those routers (e.g., via equal-cost multi-path routing (ECMP)), which is facilitated via the anycast IP addressing of routers. The routers 110, 111 can be configured to serve different regional data centers. For instance, the router 110 may serve network traffic of the data center 102, and the router 111 may serve network traffic of the data center 104. The data center 102 has an identifier "DC-CENTRAL," and the data center 104 has an identifier "DC-EAST." The data centers 102, 104 are in different geographic regions in this example and host various resources of the tenant, which in this example are applications.

FIG. 1 depicts an application connector 105A with IP address 10.2.1.1 and an application connector 105B with IP address 10.2.2.1 deployed in the data center 102. FIG. 1 also depicts an application connector 105C with IP address 10.1.1.1 and an application connector 105D with IP address 10.1.2.1 deployed in the data center 104. The illustration suggests that the application connectors 105A-D are software, but application connectors can be hardware. The application connectors 105A-B front an application instance 109A hosted in the data center 102 that has a domain name (e.g., an FQDN) "app1.local". The application connectors 105C-D front another instance 109B of the application with the domain name "app1.local" ("application instance 109B") and an application instance 113 that has a domain name "app2.local", both of which are hosted in the data center 104. As is the case for the application connectors 105A-B that front the application instance 109A, multiple application connectors can be deployed to a same data center to front an application(s) to accommodate high network traffic, such as if a data center hosts a frequently used application, if the tenant has a large number of users accessing internal resources, to provide high availability through redundancy, etc. While not depicted in FIG. 1, in other implementations, application connectors in the same data center may have varying access to the applications hosted in that data center. For instance, the application connector 105C could front the application instance 109B but not the application instance 113.

Various tunnels are established between elements of the network fabric 123 to facilitate secure communication of network traffic. A tunnel 108A is established between the secure gateway 106 and the router 110, and a tunnel 108D is established between the secure gateway 107 and the router 111. A tunnel 108B is established between the router 110 and the application connector 105A, and a tunnel 108C is established between the router 110 and the application connector 105B. A tunnel 108E is established between the router 111 and the application connector 105C, and a tunnel 108F is established between the router 111 and the application connector 105D. The routers 110, 111 are connected via a tunnel 108G. The tunnels 108A-G may be Internet Protocol security (IPsec) tunnels, for example.

A wildcard domain name configuration manager ("configuration manager") 103 executes on the network controller 101. The configuration manager 103 manages configuration of wildcard domain names by the tenant for deployment of resources encompassed by the wildcard domain names to one or more data centers. The configuration manager 103 communicates with instances of a wildcard domain name forwarding service ("forwarding service") deployed to network elements of the network fabric 123 that route network traffic to the data centers 102, 104. A first instance of the forwarding service, forwarding service 112A, executes on the router 110, and a second instance of the forwarding service, forwarding service 112B, executes on the router 111.

An example of the configuration manager 103 configuring reachability of resources that are encompassed by a wildcard domain name and deployed across data centers of the tenant, or the data centers 102, 104 in this example, is now described. The configuration manager 103 obtains a wildcard domain name configuration ("configuration") 117. The configuration 117 may be communicated to the configuration manager 103 based on submission by the tenant, such as by a network administrator of the tenant submitting the configuration 117 (e.g., via a graphical user interface (GUI)). The configuration 117 indicates a wildcard domain name 115, depicted as "*.local", and the data centers 102, 104 by their identifiers. To illustrate, a network administrator may have entered the wildcard domain name 115 and selected the data centers 102, 104 via a GUI.

The network controller 101 maintains a configuration of the tenant network, a tenant network configuration 119, that identifies the data centers 102, 104 and the IP addresses through which those data centers are accessible. In this example, the IP addresses through which the data centers 102, 104 are accessible are the IP addresses of the application connectors 105A-D. In particular, the tenant network configuration 119 indicates that the data center 102 is accessible through the IP addresses of the application connectors 105A-B, or 10.2.1.1 and 10.2.2.1, and that the data center 104 is accessible through the IP addresses of the application connectors 105C-D, or 10.1.1.1 and 10.1.2.1.

The configuration manager 103 communicates configuration data 121 to each of the forwarding services 112A-B that respectively execute on the routers 110, 111. The configuration data 121 indicates the wildcard domain name 115 and the IP addresses of the data centers 102, 104 for which the wildcard domain name has been configured. The configuration manager 103 determines the IP addresses that correspond to the data centers indicated in the configuration 117 from the tenant network configuration 119. The forwarding services 112A-B receive the configuration data 121 and configure forwarding of DNS requests that match the wildcard domain name 115 to each of the IP addresses indicated therein (i.e., the IP addresses of the application connectors 105A-D). Configuring forwarding of DNS requests can be achieved by the forwarding services 112A-B creating forwarding rules for DNS traffic. For instance, the configuration manager 103 may communicate the configuration data 121 as a forwarding rule, and the forwarding services 112A-B can install the forwarding rule. As another example, the configuration manager 103 may communicate the configuration data 121 with an instruction or command to create a forwarding rule based on the configuration data 121, which triggers creation of a forwarding rule upon receipt by the forwarding services 112A-B. The router 111 can be designated as a route next hop for DNS traffic destined from the router 110 to the application connectors 105C-D in a forwarding rule created by the forwarding service 112A. Similarly, the router 110 can be designated as a route next hop for DNS traffic destined from the router 111 to the application connectors 105A-B in a forwarding rule created by the forwarding service 112B.

Once the forwarding services 112A-B have created their respective DNS traffic forwarding rules, DNS requests can be matched to the wildcard domain name 115 and forwarded to the application connectors 105A-D and optionally load balanced within each of the data centers 102, 104 across the respective application connectors accordingly. The application instances 109A-B and application instance 113 can thus be discovered and onboarded in their respective data centers as is now described in FIG. 2.

Figure 2:
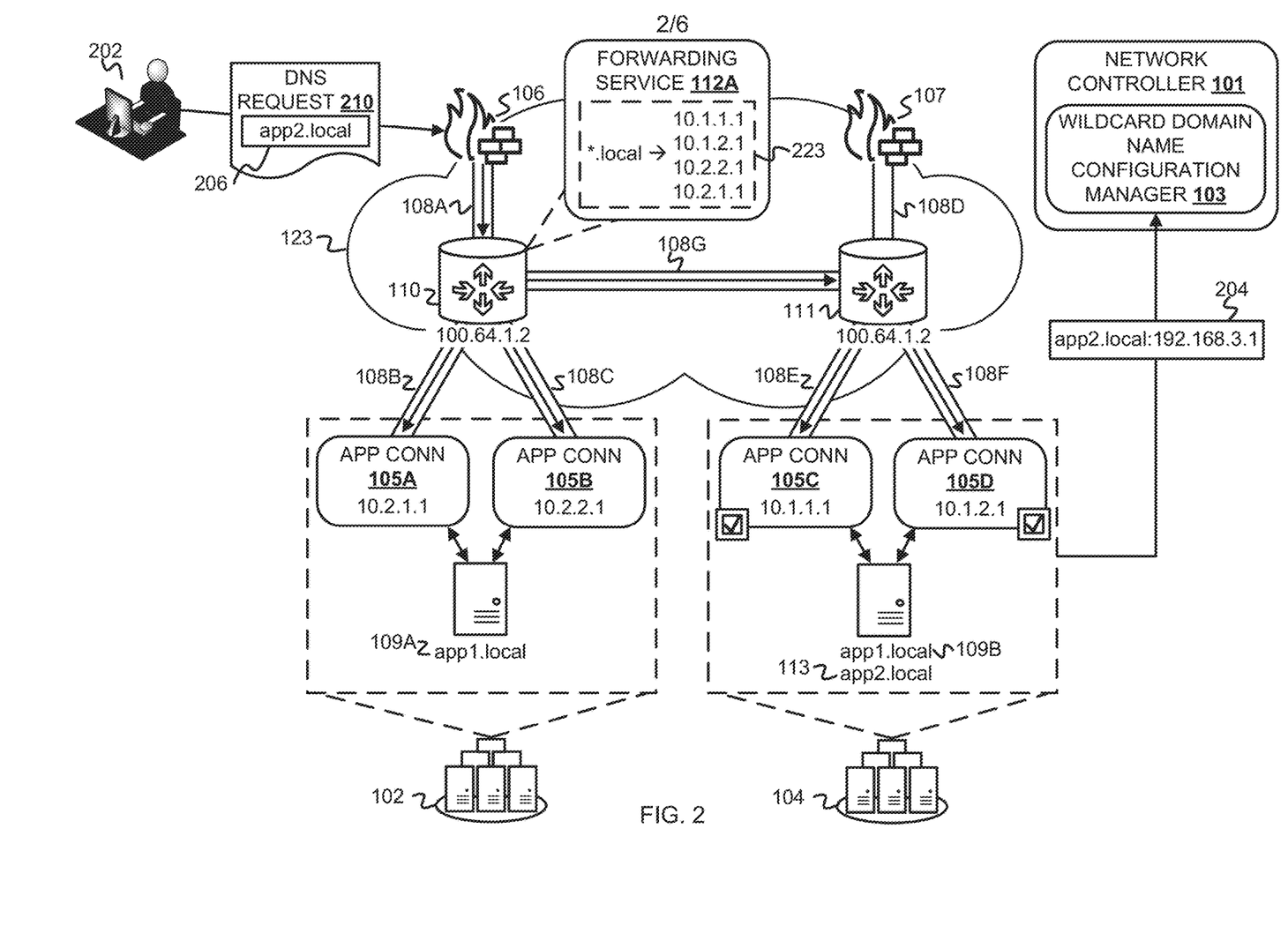
FIG. 2 is a conceptual diagram of discovering and onboarding resources of a tenant having domain names that match to a wildcard domain name configured for multiple data centers.

FIG. 2 is a conceptual diagram of discovering and onboarding resources of a tenant having domain names that match to a wildcard domain name configured for multiple data centers. FIG. 2 depicts the network fabric 123 and data centers 102, 104 of FIG. 1. FIG. 2 also depicts a forwarding rule 223 that the forwarding service 112A has created as described in reference to FIG. 1. The forwarding rule 223 may be maintained in a data structure that maps wildcard domain names to the IP addresses to which corresponding DNS requests are to be sent. A client 202 is connected to the secure gateway 106 (e.g., via a tunnel, such as a virtual private network (VPN) tunnel). Network traffic originating from the client 202 is processed and inspected by the secure gateway 106 so that any policies (e.g., security policies) can be enforced and to verify that the client 202 is allowed to access the tenant's resources hosted in the data centers 102, 104.

The secure gateway 106 receives a DNS request 210 sent by the client 202. The DNS request 210 indicates a domain name 206, which is the domain name of the application instance 113, or "app2.local". The secure gateway 106 can be configured with DNS proxy capabilities such that it attempts to resolve the domain name 206 to an IP address. Since the application instance 113 has not yet been discovered, the domain name 206 will not be resolved to an IP address, which triggers discovery operations to determine where the application instance identified by the domain name 206 is hosted. A response to the DNS request 210 thus will not be expected.

Assuming the secure gateway 106 determines that the DNS request 210 is allowed to pass, the secure gateway 106 sends the DNS request 210 to the router 110 over the tunnel 108A. The forwarding service 112A identifies the domain name 206 from the DNS request 210 and determines if the domain name 206 matches a wildcard domain name for which a forwarding rule has been configured. The domain name 206 matches to the wildcard domain name "*.local" indicated in the forwarding rule 223, and the forwarding service 112A thus determines that the DNS request 210 should be forwarded to the IP addresses 10.1.1.1, 10.1.2.1, 10.2.2.1, and 10.2.1.1 (i.e., the IP addresses of the application connectors 105A-D) as a result of the domain name match. The router 110 forwards the DNS request 210 toward each of the application connectors 105A-D over the respective tunnels. Those destined for the application connectors 105C-D will reach the router 111 via the tunnel 108G as a next hop before being directed to the application connectors 105C-D over the respective ones of the tunnels 108E-F.

Each of the application connectors 105A-D receives the DNS request 210 and attempts to resolve the domain name 206 identified from the DNS request to an IP address within its respective data center. An application connector of a data center is able to resolve the domain name 206 if a DNS entry comprising the domain name 206 is maintained for the data center and the IP address to which the domain name 206 resolves is thus routable within the data center. DNS entries for resources hosted in a data center may be maintained in a DNS server/proxy maintained in the data center (not depicted in FIG. 2) or in a DNS resolver cache of the application connectors 105A-D. In any implementation for maintaining DNS entries of a data center, the application connectors 105A-D perform a DNS lookup on the domain name 206 to determine if the domain name 206 can be resolved to an IP address associated with an application server within their respective data centers. Because the application instance 113 identified with the domain name 206 is hosted in the data center 104 but not the data center 102, the domain name 206 is resolved in the data center 102 as a result of the DNS lookups by the application connectors 105C-D.

The application connectors 105C-D notify the configuration manager 103 of the resolution of the domain name 206 in the data center 104. The application connectors 105C-D each generate a notification 204 indicating the domain name 206 and a private IP address to which the domain name 206 resolved in the data center 104, given in this example as 192.168.3.1, and communicates the notification 204 to the configuration manager 103. The configuration manager 103 receives the notification 204, which triggers onboarding of the application instance 113 in the data center 104. Since the application connectors 105A-B did not resolve the domain name 206 to an IP address, the application connectors 105A-B do not continue with onboarding of the application instance 113 after the failed DNS resolution. Also, while the configuration manager 103 obtains the notification 204 from each of the application connectors 105C-D, the configuration manager 103 onboards the application instance 113 for the data center 104 once. For instance, the configuration manager 103 may obtain the instance of the notification 204 from the application connector 105D first, which triggers onboarding of the application instance 113, and determine after receiving the instance of the notification 204 from the application connector 105C that onboarding of the application instance 113 identified therein has already been triggered for the data center 104. The second instance of the notification 204 can thus be disregarded.

While not depicted in further detail in FIG. 2, to onboard the application instance 113, the configuration manager 103 allocates a virtual IP address to the application instance 113 from routable address space of the tenant (e.g., from a preconfigured address pool/aggregate). The configuration manager 103 configures a DNS entry to resolve the domain name 206 to this virtual IP address. The configuration manager 103 also orchestrates configuration of destination network address translation (NAT) rules for the secure gateways 106, 107 to forward requests indicating the virtual IP address to which the domain name 206 resolves to an IP address by which the application is published to the network fabric 123, which can be an anycast IP address allocated to instances of the application. The configuration manager 103 can also orchestrate configuration of destination NAT rules for the application connectors 105C-D that translate the IP address by which the application is published to the network fabric 123 (e.g., the anycast IP address) to the private IP address of the application within the data center 104, which in this example is 192.168.3.1. The destination NAT rule(s) may indicate a port and/or protocol associated with the application instance 113 in addition to a destination IP address. For instance, assuming an example where the application instance 113 uses TCP and port 443, a first destination NAT rule may specify the virtual IP address, TCP, and port 443 such that network traffic indicating the virtual IP address and port 443 and that is sent according to TCP will match to the first destination NAT rule. When the application instance 113 is onboarded, the secure gateway 106 can then resolve the domain name 206 indicated in the DNS request 210 to its virtual IP address and forward the DNS request 210 to the data center 104 in which it was discovered according to the newly configured forwarding rules. Subsequent network traffic sent by the client 202 (and other clients) for accessing the application corresponding to the domain name 206 can then be routed directly to the application via the application connector 105C and/or 105D. Additionally, sessions corresponding to the application instance 113 can be load balanced across the application connectors 105C-D once the application instance 113 has been onboarded.

While not depicted in FIG. 2, the configuration manager 103 also onboards the application with application instances 109A-B having the domain name "app1.local" in both of the data centers 102, 104 based on successful DNS resolution for "app1.local" by the application connectors 105A-D. This is because instances of this application are hosted in both data centers 102, 104 and the domain name "app1.local" can thus be resolved in both data centers (i.e., by the application connectors 105A-D). Network traffic destined for the virtual IP address allocated for "app1.local" can be forwarded to either data center as a result, such as based on proximity of the data center from the sender. Additionally, as described above, while both application connectors 105A-B and application connectors 105C-D resolved the domain name "app1.local" to an IP address of their respective data centers, the configuration manager 103 may onboard the application instance 109A in each of the data centers 102, 104 once; in other words, the configuration manager 103 may not create multiple forwarding rules for "app1.local" in each individual one of the data centers 102, 104. Selection of the one of the application connectors 105A-B and 105C-D for which the configuration manager 103 will configure forwarding of DNS requests for each data center may be based on which notification is received and/or processed first. Additionally, to which application connector the routers 110, 111 forward DNS requests indicating the domain name "app1.local" can vary depending on a load balancing algorithm, based on proximity of the data centers to the origination of the request (e.g., regional proximity), etc. As illustrated in FIG. 2, different resources with different respective domain names can match to the same wildcard domain name and can be onboarded in the same or different data centers, as is the case with "app1.local" and "app2.local". Also, instances of resources with the same domain name can be hosted and onboarded in multiple data centers, as is the case with "app1.local".

While not depicted in FIGS. 1 and 2, in implementations, application connectors in a same data center may be allocated an anycast IP address such that there is a one-to-one mapping of anycast IP addresses to data centers. Following onboarding of an application in a data center, network traffic of the application destined for that data center can thus be load balanced across the application connectors having allocated that anycast IP address with equal cost. To illustrate, with reference to FIG. 1, the application connectors 105A-B can be allocated a first anycast IP address, and the application connectors 105C-D can be allocated a second anycast IP address. The tenant network configuration 119 would indicate the first anycast IP address allocated to application connectors of the data center 102 and the second anycast IP address allocated to application connectors of the data center 104. The configuration data 121 sent to the forwarding services 112A-B would therefore indicate the wildcard domain name 115 and the anycast IP addresses of the data centers 102, 104 for which the wildcard domain name has been configured. As a result, the routers 110, 111 can load balance network traffic including DNS requests across the application connectors at each data center via ECMP. To illustrate further, with reference to FIG. 2, the forwarding rule 223 would indicate the wildcard domain name "*.local" and the anycast IP addresses of each of the data centers 102, 104. When the forwarding service 112A detects a DNS request indicating a domain name that matches to this wildcard domain name, the router 110 forwards the DNS request to each of the anycast IP addresses. In this case, the DNS request is sent to either of the application connectors 105A-B in the data center 102 and either of the application connectors 105C-D. The application connector(s) that resolves the domain name to an IP address in its respective data center notifies the configuration manager 103 of the discovery of the corresponding application for onboarding of the application as described above.

Additionally, during application discovery, when anycast IP addresses are assigned to each data center to be shared by the application connectors or proxies located therein, the forwarding services 112A-B can repeat sending of DNS requests to each data center indicated in a wildcard domain name forwarding rule. DNS requests can be re-sent to a data center one or more times to mitigate dropping of DNS requests or other issues that may occur. To illustrate, with reference to FIG. 2, the forwarding service 112A can send the DNS request 210 to the anycast IP address allocated to the data center 102 and can subsequently send one or more repeats of the DNS request 210 to the data center 102 anycast IP address. Individual DNS requests sent to this anycast IP address are load balanced across the application connectors in the data center 102. As an example, the application connector 105A may receive the first instance of the DNS request 210, the application connector 105B may receive the second instance of the DNS request, and so on.

Figure 3:
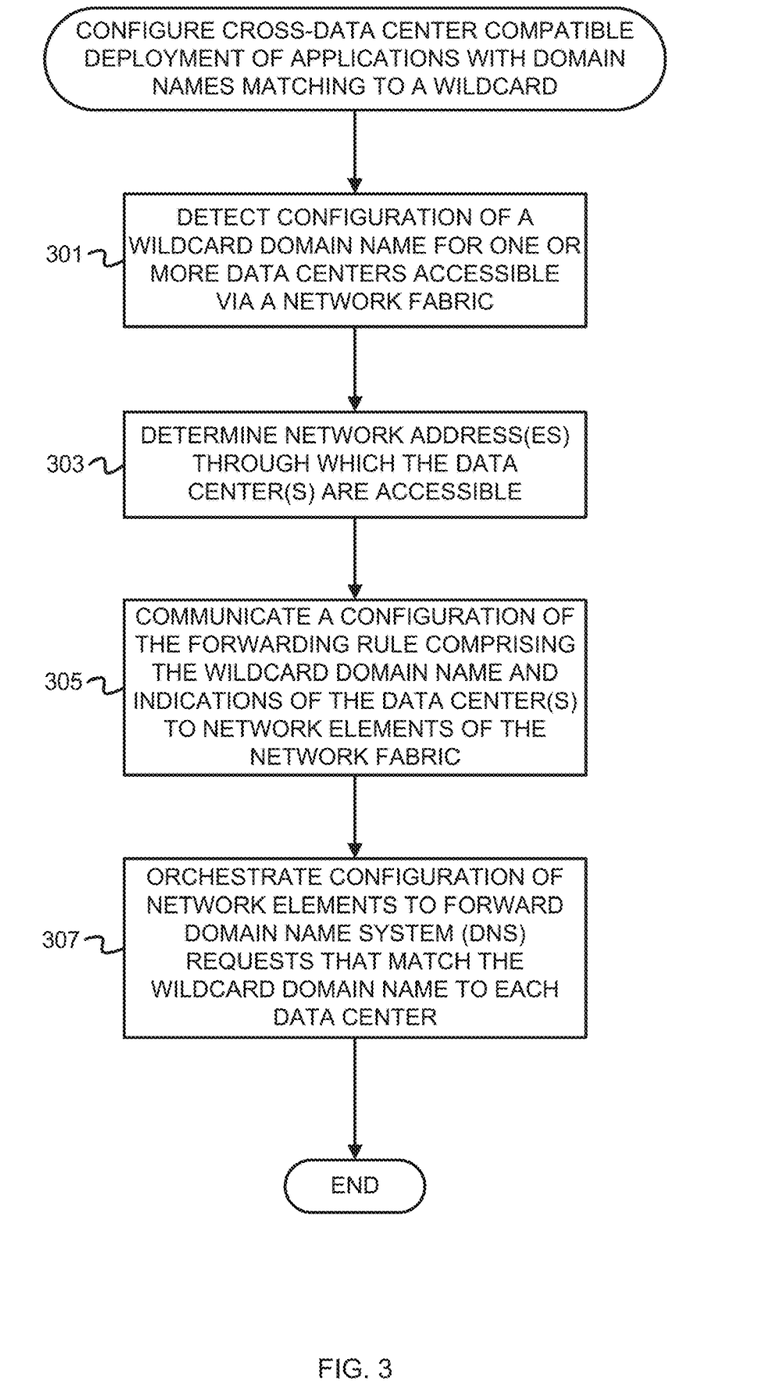
FIG. 3 is a flowchart of example operations for configuring cross-data center compatible deployment of applications with domain names matching to a wildcard.
Figure 4:
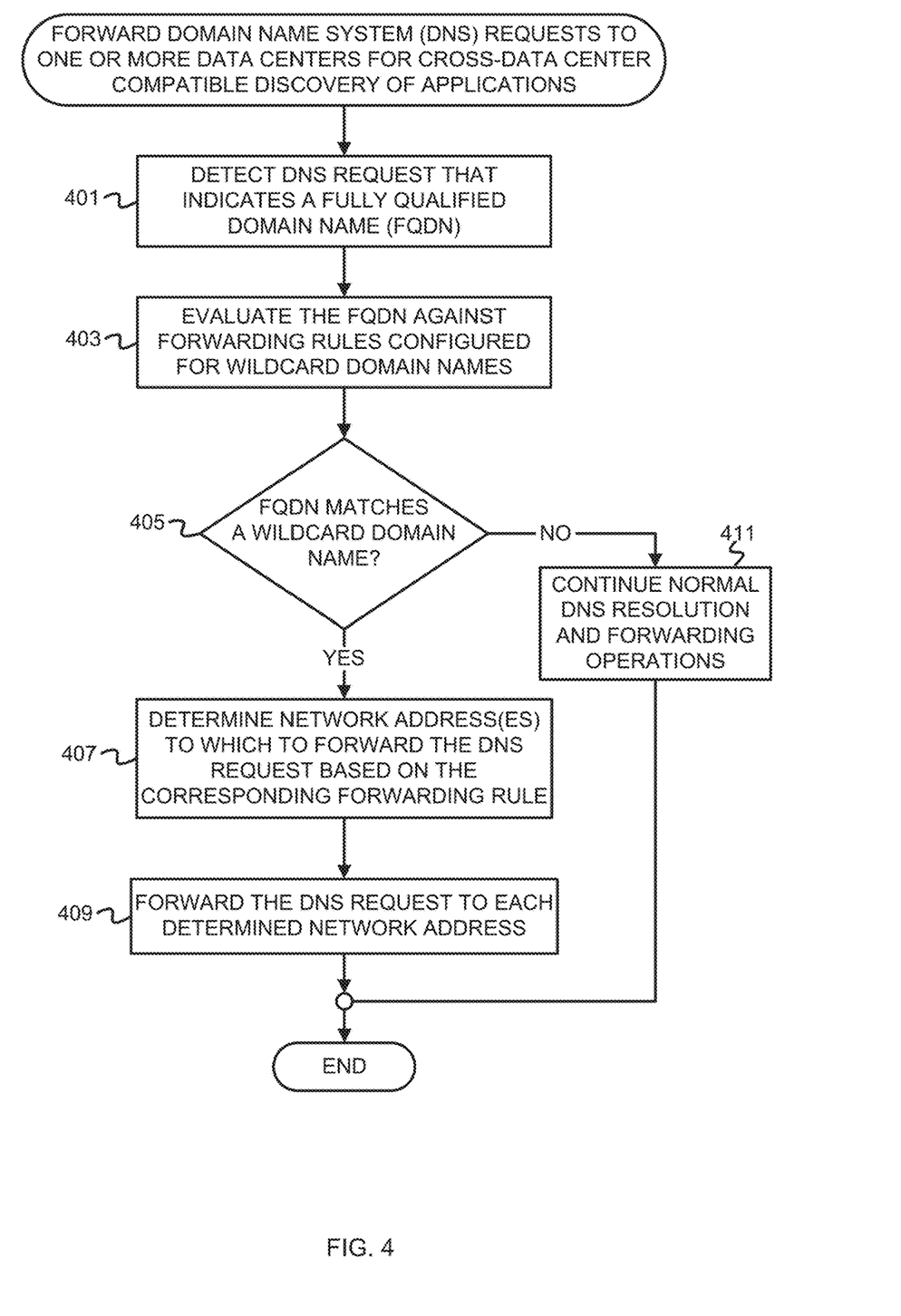
FIG. 4 is a flowchart of example operations for forwarding DNS requests to one or more data centers for cross-data center compatible discovery of applications.
Figure 5:
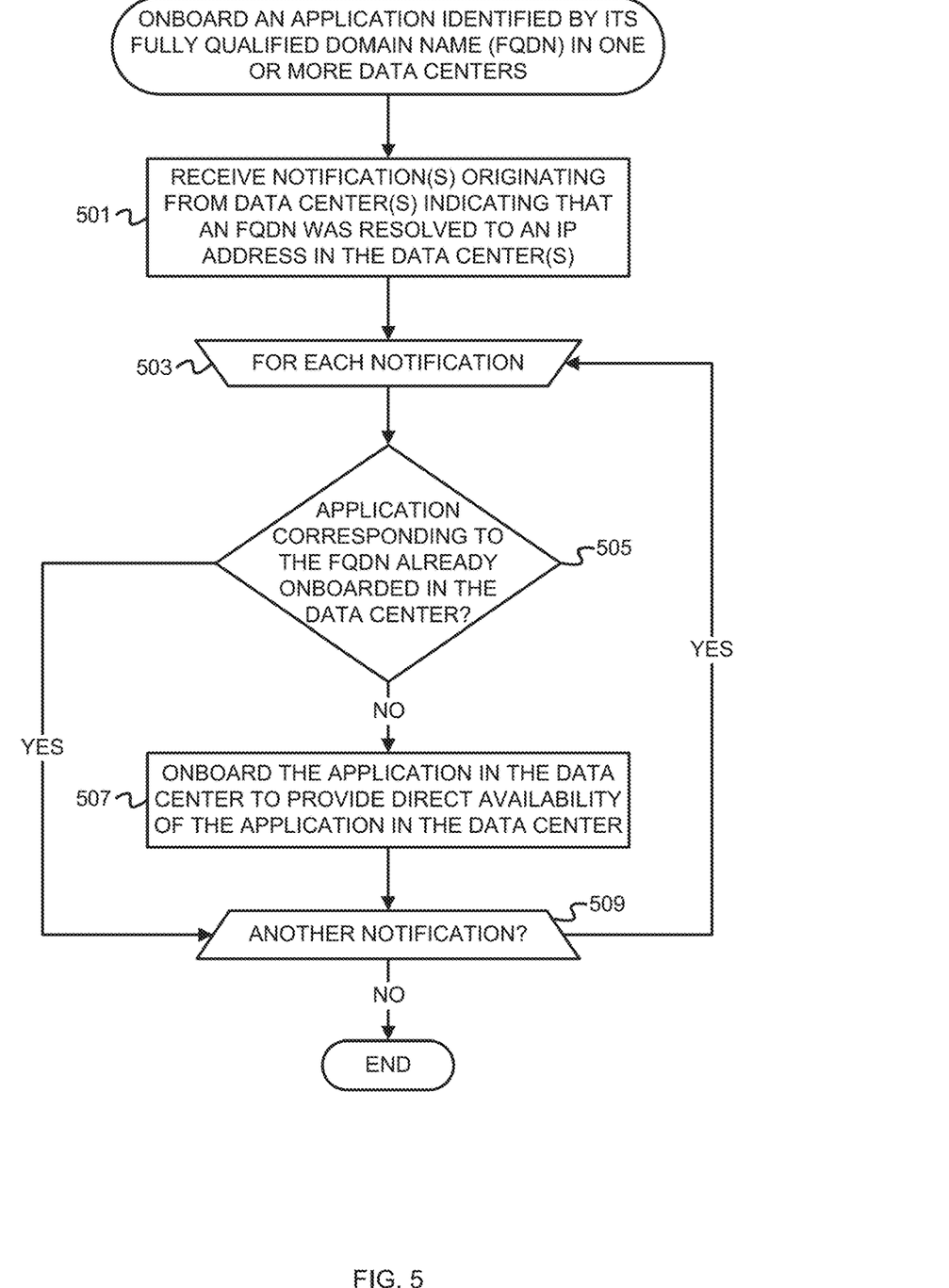
FIG. 5 is a flowchart of example operations for onboarding an application identified by its FQDN in one or more data centers.

FIGS. 3-5 are flowcharts of example operations. The example operations are described with reference to a wildcard domain name configuration manager and a wildcard domain name forwarding service (hereinafter "the configuration manager" and "the forwarding service," respectively) for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary. The example operations refer to deploying applications of a tenant in data centers, though the example operations can also be applied to other tenant resources accessible over a network (e.g., websites).

FIG. 3 is a flowchart of example operations for configuring cross-data center compatible deployment of applications with domain names matching to a wildcard. The example operations assume that a tenant hosts applications in one or more data centers and maintains a network fabric through which those data centers are accessible. The example operations also assume that the network fabric includes one or more network elements (e.g., routers) that can communicate with the configuration manager, such as over respective secure connections that have been established. The example operations are described with reference to the configuration manager.

At block 301, the configuration manager detects configuration of a wildcard domain name for one or more data centers accessible via a network fabric. The wildcard domain name can be represented with a string comprising one or more wildcard characters, such as *example.com, *example.local, etc. The configuration manager can receive configuration data that indicates the wildcard string and identifiers of one or more data centers.

At block 303, the configuration manager determines a network address(es) through which the data center(s) is/are accessible. The configuration manager maintains (e.g., in a data structure) or has access to a configuration of the tenant's network(s) that includes network addresses (e.g., IP addresses) of application connectors or other proxies instantiated in data centers that can receive network traffic on behalf of the applications hosted therein. For instance, anycast IP addresses may be allocated to application connectors or proxies in each data center, where application connectors/proxies in the same data center share an anycast IP address. The network address(es) associated with a data center (e.g., the anycast IP address) can be mapped from the data center's identifier indicated in the configuration of the wildcard domain name. The configuration manager performs a lookup of the network address(es) associated with each data center identified in the configuration of the wildcard domain name.

At block 305, the configuration manager communicates a configuration of the forwarding rule comprising the wildcard domain name and indications of the one or more data centers to the network elements within the network fabric. The configuration manager communicates this configuration data comprising the wildcard string and the data center network address(es) to each network element of the network fabric with which it communicates.

At block 307, the configuration manager orchestrates configuration of network elements to forward DNS requests that match the wildcard domain name to each data center. The configuration manager may command or instruct the network elements to create a forwarding rules(s) to forward DNS requests indicating a domain name that matches to the wildcard to each network address corresponding to a data center for which the wildcard domain name was configured (e.g., to each anycast IP address). The command or instruction can be communicated to the network elements with the configuration of the forwarding rule as described at block 305. Forwarding rules at least indicate the wildcard string and the network address(es) and may be stored in a data structure maintained by the network elements, for instance.

FIG. 4 is a flowchart of example operations for forwarding DNS requests to one or more data centers for cross-data center compatible discovery of applications. The example operations assume that wildcard domain name forwarding has been configured for at least one data center (e.g., as described in reference to FIG. 3). The example operations are described with reference to the forwarding service.

At block 401, the forwarding service detects a DNS request that indicates a FQDN. The DNS request may have been forwarded to the network element on which the forwarding service executes, such as by a firewall, a secure web gateway, or a similar component that enforces security policies to ensure network traffic is allowed before it traverses the network fabric.

At block 403, the forwarding service evaluates the FQDN indicated in the DNS request against forwarding rules configured for wildcard domain names. Each forwarding rule indicates a string with a wildcard character corresponding to a wildcard domain name. The forwarding service evaluates the FQDN against the forwarding rules to determine if the FQDN matches a string indicated by a corresponding forwarding rule and thus matches the wildcard domain name. The forwarding service may, for instance, evaluate the FQDN against a data structure in which the wildcard domain name string(s) and corresponding network address(es) were stored.

At block 405, the forwarding service determines if the FQDN matches a wildcard domain name. The forwarding service determines if the FQDN matches any of the wildcard domain name strings of the forwarding rules against which it was evaluated. If the FQDN matches a wildcard domain name for which a forwarding rule has been configured, operations continue at block 407. Otherwise, operations continue at block 411, where the forwarding service continues normal DNS resolution and forwarding operations.

At block 407, the forwarding service determines one or more network addresses to which to forward the DNS request based on the corresponding forwarding rule for which the FQDN matched. The forwarding rule to which the FQDN matched should indicate one or more network addresses (e.g., IP addresses). For instance, the forwarding rule may indicate one or more anycast IP addresses, where each anycast IP address corresponds to a data center.

At block 409, the forwarding service forwards the DNS request to each determined network address. The forwarding service may send the DNS request to each network address over a respective tunnel(s) established between the network element on which the forwarding service executes and a tunnel endpoint corresponding to the network address(es), which may be an application connector or proxy instantiated in the respective data center. In cases where the application connectors or proxies instantiated in each data center share an anycast IP address, DNS requests can be load balanced across the application connectors or proxies via ECMP. Additionally, in implementations where anycast IP addresses are allocated to each data center and the forwarding service determined one or more anycast IP addresses to which to forward the DNS request (i.e., at block 407), the forwarding service can send one or more repeats of the DNS request to each anycast IP address to mitigate potential dropped requests. Within each data center, the DNS request and the repeated DNS request(s) can be load balanced across data center elements that share the anycast IP address.

FIG. 5 is a flowchart of example operations for onboarding an application identified by its FQDN in one or more data centers. The example operations are described with reference to the configuration manager. The example operations also assume that a DNS request has been forwarded to one or more data centers connected to a network fabric for attempted DNS resolution in each data center.

At block 501, the configuration manager receives a notification(s) originating from one or more data centers indicating that an FQDN was resolved to an IP address in the data center(s). Each received notification was sent by a data center element, such as an application connector or proxy, that resolved the FQDN to an IP address in that data center. The notification identifies the sender (e.g., with an identifier of the application connector or proxy), and the FQDN.

At block 503, the configuration manager begins processing each notification for onboarding determination. The configuration manager can determine to which data center each notification corresponds based on the sender identified therein. In FIG. 5, the processing includes example operations of blocks 505, 507.

At block 505, the configuration manager determines if the application corresponding to the FQDN was already onboarded in the data center. Multiple notifications can be received for a data center, such as if multiple application connectors located in the data center resolved the FQDN to an IP address and notified the configuration manager accordingly. The configuration manager can determine if the application was onboarded in the data center based on whether a forwarding rule indicating a particular IP address of a data center element (e.g., of an application connector or proxy) has already been created for the data center. If such a forwarding rule has already been created for the data center, the duplicate notification of the DNS resolution for the data center can be ignored. If the application has already been onboarded in the data center, operations continue at block 509. If not, operations continue at block 507.

At block 507, the configuration manager onboards the application in the data center to provide direct availability of the application in the data center. Onboarding the application makes the application available in the data center. This availability is direct because protocol data units (PDUs) (e.g., data packets) indicating the FQDN can be routed to the data center for resolution to an IP address by which the application can be accessed since it has already been determined to be hosted in that data center. To onboard the application, the configuration manager configures forwarding of PDUs that indicate the first FQDN to the data center to create a path in the network fabric for PDUs indicating that FQDN. The configuration manager can configure forwarding of such PDUs by allocating a virtual IP address for the FQDN (e.g., from a pool or aggregate of routable addresses configured for the tenant), creating a DNS entry that resolves the FQDN to the virtual IP address, and orchestrating configuration of one or more destination NAT rules to forward requests that are resolved to the virtual IP address toward the data center IP address. The data center IP address may be an anycast IP address that was previously allocated to instances of the application corresponding to the FQDN and optionally the associated protocol and port, where the application connectors deployed across the data centers receive network traffic destined for the application on that anycast IP address. For instance, the configuration manager can command or instruct components of the network fabric, such as the secure gateway(s), and application connector(s)/proxy(ies) to create a respective destination NAT rule. To illustrate, the configuration manager can configure the secure gateway(s) with a first destination NAT rule that translates the virtual IP address to the anycast IP address allocated for the application and can configure the application connector(s) of the data center with a second destination NAT rule that translates the anycast IP address to a private IP address within the data center that corresponds to the server hosting the application. The destination NAT rule(s) may also indicate a protocol and/or port used by the application so that network traffic that also matches the designated protocol and/or port triggers the destination NAT according to the rule. To illustrate, the secure gateway(s) can be configured with a destination NAT rule indicating the virtual IP address and a port number and protocol with which the application was configured so that network traffic indicating the virtual IP address as a destination address, the port as a destination port, and sent according to the protocol matches the rule and triggers translation of the virtual IP address to an anycast IP address of the application.

The operations included in onboarding for a data center can be dependent on whether the application has previously been discovered in another data center. At first discovery of the application in a data center, the configuration manager allocates the virtual IP address, creates the DNS entry, and configures the destination NAT rule for the virtual IP address (e.g., to translate the virtual IP address to the data center's anycast IP address). If the application has been discovered in a different data center and the FQDN has already been allocated a virtual IP address, the configuration manager configures the application connectors/proxies of the data center with a destination NAT rule to translate destination addresses to the application's private IP address within that data center but does not repeat the allocation of a virtual IP address or DNS entry creation. An additional destination NAT rule may be configured that translates the virtual IP address to the data center's anycast IP address, where selection of the destination NAT rule may be based on proximity of the data centers represented by the destination NAT rules to the sender. Once the application has been onboarded for the data center and has a DNS entry that resolves the FQDN to a virtual IP address, the DNS entry takes precedence over the wildcard forwarding rule. For instance, upon receiving a subsequent DNS request indicating the FQDN, a secure gateway resolves the FQDN to the virtual IP address, and destination NAT and PDU forwarding from the secure gateway to the data center occurs per normal (i.e., non-discovery) operations.

At block 509, the configuration manager determines if there is another notification to process. If so, operations continue at block 503. Otherwise, operations are complete. Once the application has been onboarded in each data center in which its FQDN was discovered as described above, subsequent PDUs including DNS requests indicating the FQDN can be resolved to the virtual IP address, which is translated to a data center's IP address (e.g., the data center's anycast IP address) according to a destination NAT rule, and then routed directly to the data center(s). If the FQDN was onboarded for multiple data centers, PDUs indicating the FQDN can be routed to any of the data centers, such as based on proximity.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the example operations of FIG. 5 for processing notifications can be performed in parallel or concurrently as notifications are received. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
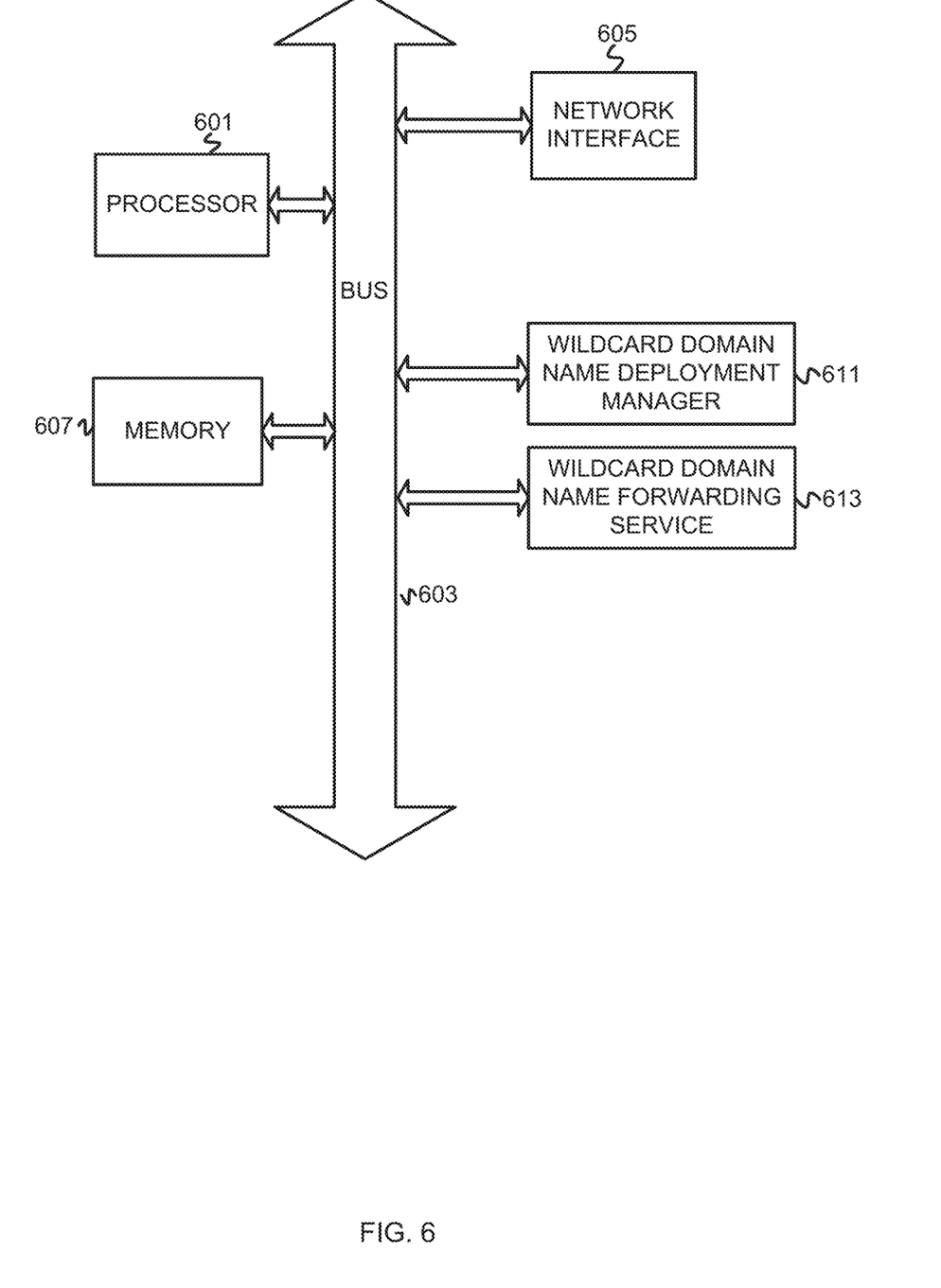
FIG. 6 depicts an example computer system with a wildcard domain name configuration manager and a wildcard domain name forwarding service.

FIG. 6 depicts an example computer system with a wildcard domain name configuration manager and a wildcard domain name forwarding service. The computer system includes a processor 601 (possibly including multiple processors, multiple cores, multiple nodes, and/or implementing multi-threading, etc.). The computer system includes memory 607. The memory 607 may be system memory or any one or more of the above already described possible realizations of machine-readable media. The computer system also includes a bus 603 and a network interface 605. The system also includes wildcard domain name configuration manager 611 and wildcard domain name forwarding service 613. The wildcard domain name configuration manager 611 configures cross-data center reachability of tenant resources having domain names that match to a wildcard domain name configured by the tenant. The wildcard domain name configuration manager 611 also onboards resources that have been discovered as deployed in a data center to that data center. The wildcard domain name forwarding service 613 forwards DNS requests that match the wildcard domain name to one or more data centers to facilitate discovery of the resources in the respective data centers in which they are deployed. While depicted as part of the same computer system in FIG. 6, the wildcard domain name configuration manager 611 and the wildcard domain name forwarding service 613 do not necessarily execute as part of the same system. For instance, the wildcard domain name configuration manager 611 can execute as part of a network controller and the wildcard domain name forwarding service 613 can execute as part of a network element that can communicate with the network controller. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

The invention claimed is:

1. A method comprising,
detecting configuration of a forwarding rule that indicates a first domain name and a plurality of data centers of a tenant, wherein the first domain name comprises a wildcard character;
configuring reachability of applications of the tenant having domain names that match to the first domain name and that are deployed across the plurality of data centers of the tenant,
wherein configuring reachability of the applications of the tenant having domain names that match to the first domain name comprises,
communicating, to each of a plurality of network elements, a configuration of the forwarding rule that indicates the first domain name and the plurality of data centers; and
configuring the plurality of network elements to forward domain name system (DNS) requests matching to the first domain name to each of the plurality of data centers.

2. The method of claim 1, wherein configuring the plurality of network elements to forward DNS requests matching to the first domain name to each of the plurality of data centers comprises configuring a plurality of forwarding rules to forward DNS requests that match to the first domain name from each of the plurality of network elements to corresponding ones of a plurality of IP addresses, wherein each of the plurality of IP addresses is associated with a corresponding one of the plurality of data centers.

3. The method of claim 2, wherein configuring the plurality of forwarding rules to forward DNS requests from the plurality of network elements to corresponding ones of the plurality of IP addresses comprises configuring forwarding of DNS requests matching to the first domain name to respective ones of a plurality of application connectors, wherein each of the plurality of application connectors has been deployed to a respective one of the plurality of data centers and has been assigned one of the plurality of IP addresses.

4. The method of claim 3, wherein the plurality of IP addresses comprise anycast IP addresses, and wherein subsets of the plurality of application connectors that are within a same one of the plurality of data centers have been assigned a same one of the anycast IP addresses.

5. The method of claim 1 further comprising,
based on forwarding of a first DNS request comprising a first fully qualified domain name (FQDN) that matches to the first domain name to each of the plurality of data centers, determining that the first FQDN was resolved in a first data center of the plurality of data centers; and
indicating that an application associated with the first FQDN is located in the first data center.

6. The method of claim 5 further comprising,
based on forwarding of a second DNS request comprising the first FQDN that matches to the first domain name to each of the plurality of data centers, determining that the first FQDN was also resolved in a second data center of the plurality of data centers, wherein the first and second data centers are different; and
indicating that the application associated with the first FQDN is also located in the second data center.

7. The method of claim 5 further comprising,
based on forwarding of a third DNS request comprising a second FQDN that matches to the first domain name to each of the plurality of data centers,
determining that the second FQDN was resolved in a third data center of the plurality of data centers,
wherein the first and second FQDNs are different,
wherein the first and third data centers are different; and
indicating that an application associated with the second FQDN is located in the third data center.

8. The method of claim 5, wherein indicating that the application associated with the first FQDN is located in the first data center comprises configuring forwarding of DNS requests that indicate the first FQDN to the first data center.

9. The method of claim 8 further comprising,
allocating a virtual IP address to the first FQDN; and
configuring a DNS entry that resolves the first FQDN to the virtual IP address,
wherein configuring forwarding of DNS requests that indicate the first FQDN to the first data center comprises configuring forwarding of DNS requests that resolve to the virtual IP address and indicate a protocol and port used by the application associated with first FQDN to the first data center.

10. One or more non-transitory machine-readable media having program code stored thereon, the program code comprising instructions to:
detect configuration of a forwarding rule that indicates a first domain name and a plurality of data centers of a tenant, wherein the first domain name comprises a wildcard character, wherein resources of the tenant having fully qualified domain names (FQDNs) that match to the first domain name are hosted in respective ones of the plurality of data centers;
communicate, to each of a plurality of network elements of a network fabric that route network traffic to the plurality of data centers, an indication of the first domain name and network addresses associated with the plurality of data centers; and
configure forwarding of domain name system (DNS) requests indicating FQDNs that match to the first domain name from each of the plurality of network elements to each of the plurality of data centers.

11. The non-transitory machine-readable media of claim 10, wherein the instructions to configure forwarding of DNS requests indicating FQDNs that match to the first domain name from each of the plurality of network elements to each of the plurality of data centers comprise instructions to, for each of the plurality of network elements, configure a plurality of forwarding rules, wherein each of the plurality of forwarding rules indicates a corresponding one of the network addresses that is associated with one of the plurality of data centers.

12. The non-transitory machine-readable media of claim 11, wherein each of the network addresses is an Internet Protocol (IP) address of an application connector instantiated in one of the plurality of data centers, wherein each of the plurality of forwarding rules is to forward DNS requests indicating FQDNs that match to the first domain name to an IP address of an application connector instantiated in a respective one of the plurality of data centers.

13. The non-transitory machine-readable media of claim 10, wherein the program code further comprises instructions to:
based on forwarding of a first DNS request comprising a first FQDN that matches to the first domain name to each of the plurality of data centers, determine that the first FQDN was resolved in one or more data centers of the plurality of data centers; and
for each of the one or more data centers in which the first FQDN was resolved, configure forwarding of DNS requests that indicate the first FQDN to the data center.

14. The non-transitory machine-readable media of claim 13, wherein the program code further comprises instructions to:
based on forwarding of a second DNS request comprising a second FQDN that matches to the first domain name to each of the plurality of data centers,
determine that the second FQDN was resolved in one or more data centers of the plurality of data centers, wherein the second FQDN differs from the first FQDN, wherein at least a first of the one or more data centers in which the second FQDN was resolved differs from any of the one or more data centers in which the first FQDN was resolved; and
for each of the one or more data centers in which the second FQDN was resolved, configure forwarding of DNS requests that indicate the second FQDN to the data center.

15. An apparatus comprising:
a processor; and
a machine-readable medium having instructions stored thereon that are executable by the processor to cause the apparatus to,
detect configuration of a forwarding rule that indicates a first domain name and a plurality of data centers of a tenant, wherein the first domain name comprises a wildcard character;
configure reachability of applications of the tenant having domain names that match to the first domain name and that are deployed across the plurality of data centers of the tenant,
wherein the instructions to configure reachability of the applications of the tenant having domain names that match to the first domain name comprise instructions to,
communicate, to each of a plurality of network elements that route network traffic to the plurality of data centers, an indication of the first domain name and network addresses associated with corresponding ones of the plurality of data centers; and
configure each the plurality of network elements to forward domain name system (DNS) requests that match to the first domain name to each of the plurality of data centers.

16. The apparatus of claim 15, wherein the instructions executable by the processor to cause the apparatus to configure each of the plurality of network elements to forward DNS requests matching to the first domain name to each of the plurality of data centers comprise instructions executable by the processor to cause the apparatus to, for each of the network addresses associated with corresponding ones of the plurality of data centers, configure a forwarding rule to forward DNS requests that match to the first domain name to the network address.

17. The apparatus of claim 15 further comprising:
based on forwarding of a first DNS request comprising a first fully qualified domain name (FQDN) that matches to the first domain name to each of the plurality of data centers, determine that the first FQDN was resolved in a first data center of the plurality of data centers; and
onboard an application having the first FQDN in the first data center.

18. The apparatus of claim 17, wherein the instructions executable by the processor to cause the apparatus to onboard the application having the first FQDN in the first data center comprise instructions executable by the processor to cause the apparatus to,
allocate a virtual IP address to the first FQDN;
configure a DNS entry that resolves the first FQDN to the virtual IP address; and
configure forwarding of DNS requests that resolve to the virtual IP address and indicate a protocol and port used by the application to the first data center.

19. The apparatus of claim 17 further comprising,
based on forwarding of a second DNS request comprising the first FQDN that matches to the first domain name to each of the plurality of data centers, determine that the first FQDN was also resolved in a second data center of the plurality of data centers, wherein the first and second data centers are different; and
onboard the application having the first FQDN in the second data center.

20. The apparatus of claim 17 further comprising,
based on forwarding of a third DNS request comprising a second FQDN that matches to the first domain name to each of the plurality of data centers,
determine that the second FQDN was resolved in a third data center of the plurality of data centers,
wherein the first and second FQDNs are different,
wherein the first and third data centers are different; and
onboarding an application having the second FQDN in the third data center.

* * * * *